United States Patent [19]

Dick

[11] 4,131,770

[45] Dec. 26, 1978

[54] COMMON BELL RINGING APPARATUS FOR MULTIPLE BUTTON KEY TELEPHONE SET

[76] Inventor: William J. Dick, 188-20A 69th Ave., Flushing, N.Y. 11365

[21] Appl. No.: 811,173

[22] Filed: Jun. 29, 1977

[51] Int. Cl.² .............................................. H04M 1/26
[52] U.S. Cl. ................................................... 179/84 L
[58] Field of Search ................. 179/81 R, 81 C, 84 R, 179/84 L, 84 T, 99, 1 MN; 250/213 A, 551, 215; 340/190; 307/116

[56] References Cited

U.S. PATENT DOCUMENTS

| | | | |
|---|---|---|---|
| 3,406,262 | 10/1968 | Grandstaff | 179/84 R |
| 3,469,036 | 9/1969 | Meri | 179/81 C |
| 3,566,044 | 2/1971 | Cross | 179/84 L |
| 3,875,348 | 4/1975 | Kopec | 179/84 R |

*Primary Examiner*—Kathleen H. Claffy
*Assistant Examiner*—Joseph A. Popek
*Attorney, Agent, or Firm*—Brumbaugh, Graves, Donohue & Raymond

[57] ABSTRACT

A common telephone bell ringing device has a plurality of input terminals adapted to be connected to the ringing sides of a plurality of incoming telephone lines, an output terminal adapted to be connected to a telephone bell, a common terminal for said output and input terminals, a plurality of photoresistors connected between said output terminal and said input terminals, respectively, each being essentially non-conductive when not exposed to radiant energy and conductive when radiant energy impinges thereon, and a plurality of radiant energy sources such as neon lamps connected between said common terminal and said input terminals respectively, each neon lamp being mounted in a light tight enclosure with a corresponding photoresistor so that ringing current on one of said input terminals energizes a corresponding neon lamp to reduce the resistance of a corresponding photoresistor and permit the ringing current to pass to the bell without feedback to any other input terminal.

6 Claims, 1 Drawing Figure

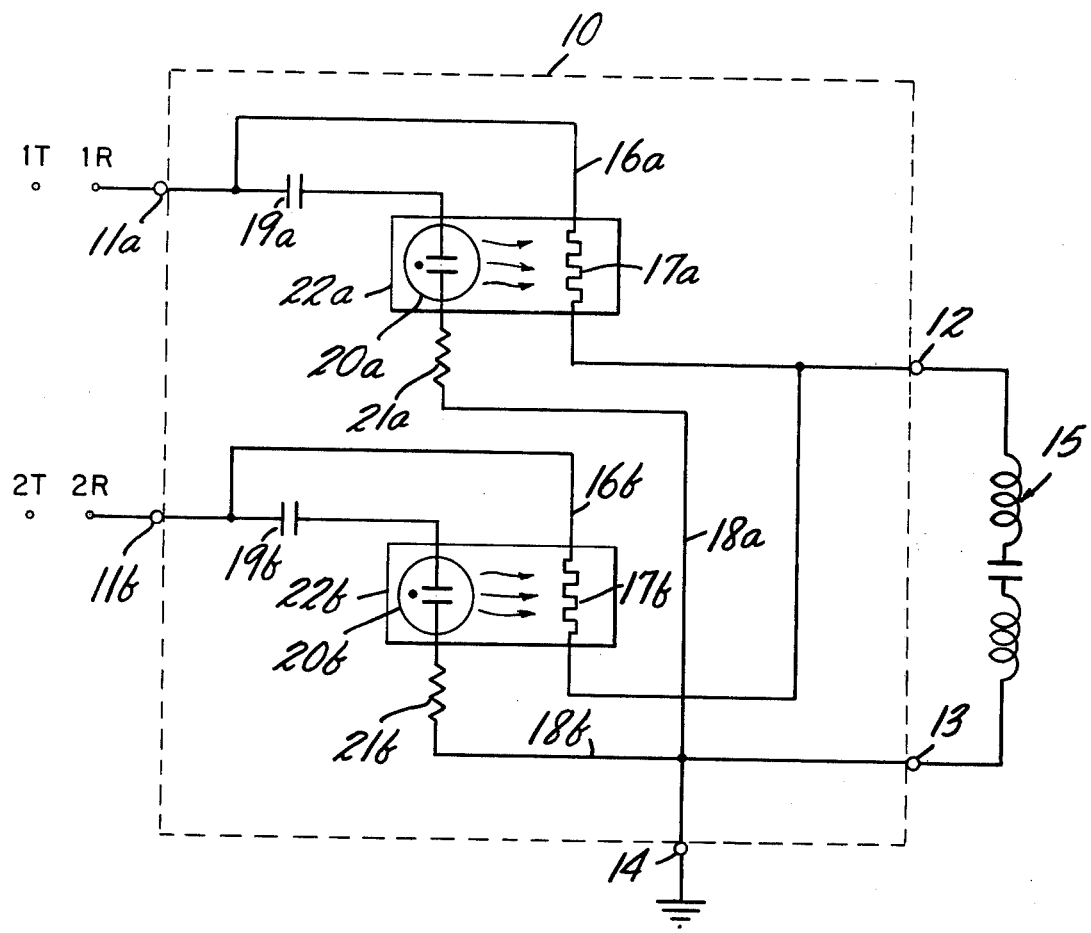

COMMON BELL RINGING APPARATUS FOR MULTIPLE BUTTON KEY TELEPHONE SET

BACKGROUND OF THE INVENTION

The present invention relates to telephone equipment and more particularly to a new and improved bell ringing device which is capable of causing any line or combination of lines of a multiple button key telephone set to ring without producing interference in any other line.

In the typical multiple button key telephone set, it is desirable that all incoming lines or any combination of lines be made to ring to signal incoming calls without causing interference in any other line. In the past, this has sometimes been accomplished by common bell or matrix half-cycle ringing. It has also been proposed in patent No. 3,406,262 to Grandstaff to use the ringing current in any one of a plurality of telephone lines to energize a glow lamp the radiation from which impinges on a photocell and initiates operation of a common electronic ringer.

A similar, common, audible signaling circuit utilizing radiation from a neon lamp falling on a photocell to generate an initiating signal in response to ringing current is disclosed in patent No. 3,875,348 to Kopec et al. All such proposals require wiring and electrical components external to the telephone instrument and, therefore, are time consuming and expensive to install.

SUMMARY OF THE INVENTION

It is an object of the invention, accordingly, to provide a new and improved common telephone bell ringing device which is capable of causing all or any combination of telephone lines to a multibutton telephone key set to ring without the use of any external wiring and without causing interference in any incoming line.

Another object of the invention is to provide a new and improved bell ringing device of the above character which is simple and inexpensive yet allows complete flexibility as to which line or lines will or will not ring.

A further object of the invention is to provide a new and improved bell ringing device of the above character that can be installed easily and quickly inside a telephone instrument.

According to the invention, the ringing sides of a plurality of lines are connected to the high side of a telephone signalling device such as a bell through a plurality of circuits in each of which is a normally essentially non-conductive element which is adapted to be rendered conducting in response to ringing current on the ringing side of the corresponding line. This energizes the bell but the presence of the normally non-conductive element in each of the other circuits from the lines to the bell prevents the ringing current from getting into such other circuits and interfering therewith.

More specifically, the normally non-conductive element may be a device such as a photoresistor which is normally highly resistive but is adapted to be rendered more conductive in response to radiant energy produced by a light source energized by ringing current on the corresponding line, there being a separate light source for each photoresistor, connected to the ringing side of the corresponding incoming telephone line for energization by ringing current therefrom.

DESCRIPTION OF A PREFERRED EMBODIMENT

For a better understanding of the invention, reference is made to the following description of a preferred embodiment, taken in conjunction with the accompanying drawing which illustrates schematically a common telephone bell ringing device constructed according to the invention. In the interest of clarity, the talking portions of the telephone equipment have been omitted.

Referring to the drawing, a bell ringing device 10 according to the invention has a plurality of input terminals 11a and 11b, a pair of output terminals 12 and 13 and a common ground terminal 14. The terminals 11a and 11b are adapted to be connected to the ringing sides 1R and 2R, respectively, of a plurality of incoming telephone lines. In a typical six button key telephone there are five incoming lines but only two are shown in the figure in the interest of simplicity since the multiplexer circuits are identical for each line.

The output terminals 12 and 13 are adapted to be connected to a telephone signalling device such as the bell 15, the output terminal 13 also being connected to the common terminal 14.

A conductor 16a connects a photoresistor 17a between the output terminal 12 and the input terminal 11a. The photoresistor 17a, when unexposed to radiant energy, has a high resistance, say 10 Megohms which, upon exposure to radiant energy drops to a much lower value, say 4,000 ohms. In similar fashion, a conductor 16b connects a like photoresistor 17b between the output terminal 12 and the input terminal 11b.

A conductor 18a connects a capacitor 19a, a source of radiant energy such as a neon lamp 20a and a current limiting resistor 21a in series between the ground terminal 14 and the input terminal 11a. The neon lamp 20a and the photoresistor 17a are mounted in a light tight enclosure 22a with the lamp positioned to direct radiant energy to the photoresistor when the former is energized.

Similarly, a conductor 18b connects a capacitor 19b, a current limiting resistor 21b and a neon lamp 20b in series across the terminals 14 and 11b, with the lamp 20b in a light tight enclosure 22b also containing the photoresistor 17b and positioned to direct radiant energy to the latter.

In operation, let it be assumed that an incoming call causes a 20Hz ringing signal to appear at the ring side 1R of the line. This signal flows through the capacitor 19a, the lamp 20a and the current limiting resistor to ground, causing the lamp 20a to glow. Radiant energy from the lamp 20a impinges on the photoresistor 17a causing its resistance to drop from 10 Megohms to 4,000 ohms and permitting the ringing signal current to flow through the bell 15 to ground so that the bell rings. Since the resistance of the photoresistor 17b is at its maximum value at this time it blocks the passage of current and prevents any feedback of the ringing signal on the ringing line 1R to the ringing line 2R.

In similar fashion, a call on an incoming line causing a ringing signal to appear on the ringing side 2R of the line results in energization of the lamp 20b and ringing of the bell without feedback of the ringing signal to the ringing line 1R.

In practice, the circuit components may be mounted on a small printed circuit board that can easily be installed inside the telephone instrument and connected to the bell and ringing line terminals.

The invention thus provides a novel and highly effective bell ringing device for causing all or any combination of incoming lines to a multibutton key telephone to ring without producing interference in any other line or lines. By connecting the ringing side of each incoming line to the bell through a normally non-conductive element which is adapted to be rendered conductive in response to ringing current on the corresponding line, this result is achieved in a simple and inexpensive manner and without the necessity for extensive external wiring.

While the invention has been disclosed as applied to a telephone bell ringing device, it will be understood that it can be applied with equal effectiveness in applications where it is desired to energize an output device from any one or combination of input lines without introducing interference into any other input line. Also, it will be understood that the specific embodiment disclosed is merely illustrative and is susceptible of modification in form and detail within the scope of the following claims.

I claim:

1. An apparatus for selectively controlling the energization of an output circuit with an electrical signal of given character from one of a plurality of input circuits, comprising:
    a plurality of input terminals adapted to be connected to said input circuits, respectively,
    an output terminal adapted to be connected to said output circuit,
    a common terminal for said input and output circuits,
    a first plurality of circuit means connected between said common terminal and said input terminals, respectively, each responsive only to an electrical signal of said given character and each having current responsive radiant energy emitting means therein, and
    a second plurality of circuit means connected between said output terminal and said input terminals, respectively, and each having radiant energy responsive current controlling means therein,
    each of said radiant energy responsive controlling means having electrical conductivity adapted to change from a given value to a different value responsive, respectively, to radiant energy from a corresponding current responsive radiant energy emitting means in said first plurality of circuit means, whereby the application of electrical signals of said given character selectively to said input circuits is effective to change the electrical conductivity of the corresponding radiant energy responsive current controlling means from said given value to said different value for controlling the energization of the output circuit.

2. Apparatus as defined in claim 1 in which said radiant energy responsive current controlling means normally block the passage of current and, when subjected to radiant energy, allow current to pass.

3. Apparatus as defined in claim 2 in which the current responsive radiant energy emitting means are electric lamps and the radiant energy responsive means are photoresistors.

4. Apparatus as defined in claim 3 in which each electric lamp is mounted in a light tight enclosure with the photoresistor, and is disposed to direct radiant energy to the photoresistor.

5. Apparatus as defined in claim 4 in which each of said first plurality of circuit means has connected in series therein a current limiting resistor and a capacitance.

6. Apparatus as defined in claim 1 together with a telephone call signalling device connected to said output terminal and to said common terminal, and a plurality of telephone ringing lines connected to said respective input terminals and to said common terminal.

* * * * *